US009266409B2

(12) United States Patent
Tooker et al.

(10) Patent No.: US 9,266,409 B2
(45) Date of Patent: Feb. 23, 2016

(54) REAR SLIDER WINDOW ASSEMBLY WITH ANGLED MOVABLE WINDOW PANEL

(71) Applicant: MAGNA MIRRORS OF AMERICA, INC., Holland, MI (US)

(72) Inventors: Troy F. Tooker, Allegan, MI (US); Dustin L. Ward, Jenison, MI (US); Peggy L. Gustafson, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 14/522,735

(22) Filed: Oct. 24, 2014

(65) Prior Publication Data

US 2015/0115649 A1 Apr. 30, 2015

Related U.S. Application Data

(60) Provisional application No. 61/897,259, filed on Oct. 30, 2013.

(51) Int. Cl.
*B60J 1/18* (2006.01)

(52) U.S. Cl.
CPC .................... *B60J 1/1853* (2013.01)

(58) Field of Classification Search
CPC ..................................... B60J 1/1853
USPC .............. 296/190.1, 190.11, 146.15, 146.16, 296/201, 190.08, 190.09, 147, 145; 49/125, 49/169–171, 413, 504
See application file for complete search history.

(56) References Cited

U.S. PATENT DOCUMENTS

| | | | | |
|---|---|---|---|---|
| 4,116,483 A | * | 9/1978 | Kramer | B60J 1/04 296/190.1 |
| 4,124,054 A | * | 11/1978 | Spretnjak | E06B 3/4681 160/90 |
| 4,133,574 A | * | 1/1979 | Martin | B60H 1/00378 165/43 |
| 4,232,483 A | * | 11/1980 | Lockshin | B60J 1/2088 296/95.1 |
| 4,920,698 A | | 5/1990 | Friese et al. | |
| 4,995,195 A | | 2/1991 | Olberding et al. | |
| 5,146,712 A | | 9/1992 | Hlavaty | |
| 5,531,046 A | | 7/1996 | Kollar et al. | |
| 5,572,376 A | | 11/1996 | Pace | |
| 5,658,040 A | * | 8/1997 | Nicholls | B62D 33/0617 296/146.15 |
| 5,799,444 A | | 9/1998 | Freimark et al. | |
| 5,996,284 A | | 12/1999 | Freimark et al. | |
| 6,026,611 A | | 2/2000 | Ralston et al. | |
| 6,119,401 A | | 9/2000 | Lin et al. | |
| 6,286,891 B1 | * | 9/2001 | Gage | B60J 1/06 296/146.15 |

(Continued)

*Primary Examiner* — Dennis H Pedder
(74) *Attorney, Agent, or Firm* — Gardner, Linn, Burkhart & Flory, LLP

(57) ABSTRACT

A slider window assembly for a vehicle includes a frame portion having an upper rail and a lower rail and a pair of spaced apart generally vertical frame members, and at least one fixed window panel and a movable window panel. The upper rail includes an upper channel for movably receiving an upper region of the movable window and the lower rail includes a lower channel for movably receiving a lower region of the movable window. The upper rail has a depth dimension that is greater than a depth dimension of the lower rail. The generally vertical frame members are tapered so that the end regions have depth dimensions that are similar to the depth dimensions of the respective rail. The generally vertical frame members have upper attachment portions that are generally wedge-shaped and are configured for press fit attachment at correspondingly formed recesses established at the upper rail.

20 Claims, 16 Drawing Sheets

(56) References Cited

U.S. PATENT DOCUMENTS

| | | | |
|---|---|---|---|
| 6,691,464 B2 | 2/2004 | Nestell et al. | |
| 6,902,224 B2 * | 6/2005 | Weinert | B60J 1/1853 296/146.16 |
| 6,955,009 B2 | 10/2005 | Rasmussen | |
| 7,003,916 B2 * | 2/2006 | Nestell | B60J 1/1853 49/125 |
| 7,073,293 B2 | 7/2006 | Galer | |
| 7,185,943 B2 * | 3/2007 | Lesle | E05F 15/652 296/146.16 |
| RE40,636 E * | 2/2009 | Weinert | B60J 1/1853 296/146.16 |
| RE41,502 E | 8/2010 | Neaux | |
| 8,246,101 B2 * | 8/2012 | Cicala | B60J 1/1861 296/146.16 |
| 8,402,695 B2 | 3/2013 | Smith et al. | |
| 8,881,458 B2 | 11/2014 | Snider et al. | |
| 8,915,018 B2 | 12/2014 | Snider | |
| 2003/0213179 A1 | 11/2003 | Galer | |
| 2004/0020131 A1 | 2/2004 | Galer et al. | |
| 2005/0150170 A1 * | 7/2005 | Lahnala | B60J 1/1853 49/413 |
| 2006/0032140 A1 * | 2/2006 | Arimoto | E05F 15/646 49/209 |
| 2006/0107600 A1 | 5/2006 | Nestell et al. | |
| 2006/0260205 A1 * | 11/2006 | Dufour | B60J 1/1853 49/413 |
| 2008/0060275 A1 * | 3/2008 | Recker | B60J 1/1853 49/408 |
| 2008/0127563 A1 | 6/2008 | Tooker | |
| 2010/0122494 A1 * | 5/2010 | Lahnala | E05D 15/0686 49/358 |
| 2010/0122497 A1 * | 5/2010 | Lahnala | B60J 1/1853 49/413 |
| 2012/0110915 A1 * | 5/2012 | Lahnala | B60J 10/042 49/413 |
| 2013/0255156 A1 * | 10/2013 | Snider | B60J 1/1853 49/130 |
| 2014/0047772 A1 | 2/2014 | Hulst | |
| 2015/0028622 A1 | 1/2015 | Lahnala | |
| 2015/0042127 A1 * | 2/2015 | Lahnala | B60J 10/0062 296/190.1 |
| 2015/0101254 A1 * | 4/2015 | Tooker | B60J 1/1853 49/413 |
| 2015/0115649 A1 * | 4/2015 | Tooker | B60J 1/1853 296/146.16 |

* cited by examiner

REAR SLIDER WINDOW ASSEMBLY WITH ANGLED MOVABLE WINDOW PANEL

CROSS REFERENCE TO RELATED APPLICATION

The present application claims the filing benefits of U.S. provisional application Ser. No. 61/897,259, filed Oct. 30, 2013, which is hereby incorporated herein by reference in its entirety.

FIELD OF THE INVENTION

The present invention relates to a slider window assembly for a vehicle and, more particularly, a rear slider window assembly for a vehicle and, more particularly, a rear slider window assembly for a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window.

SUMMARY OF THE INVENTION

The present invention provides a rear slider window assembly that has an angled movable window panel that is angled relative to the fixed window panel or panels to reduce glare to the driver of the vehicle equipped with the rear slider window assembly. The window assembly includes an upper guide rail and a lower guide rail, which guide the movable window panel between its opened and closed positions relative to the opening between the fixed window panels. A pair of vertical frame portions are established between the upper and lower rails and at either side of the opening. The vertical frame portions are wedge shaped or angled or tapered to correspond with the angle of the movable window panel. The vertical frame portions are assembled to the upper and/or lower frame portions via a snap together or interference fit construction to provide air and water tight connections or joints between the upper ends of the vertical frame portions and the upper rail and between the lower ends of the vertical frame portions and the lower rail.

These and other objects, advantages, purposes and features of the present invention will become apparent upon review of the following specification in conjunction with the drawings.

DESCRIPTION OF THE PREFERRED EMBODIMENTS

Figure 1:
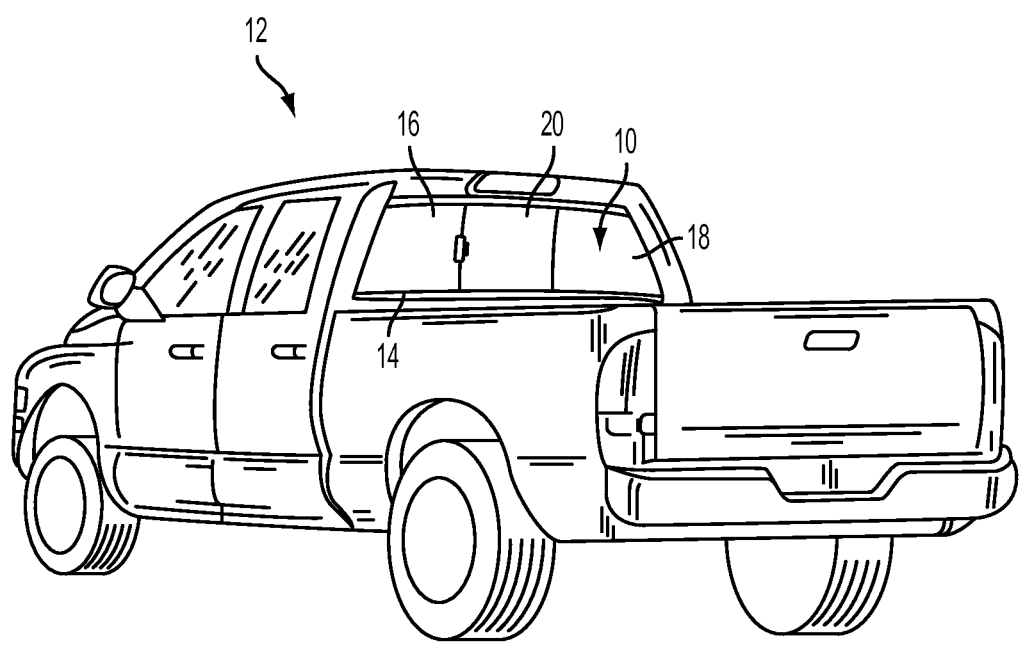
FIG. 1 is a rear perspective view of a pickup truck having a rear slider window assembly in accordance with the present invention.
Figure 2:
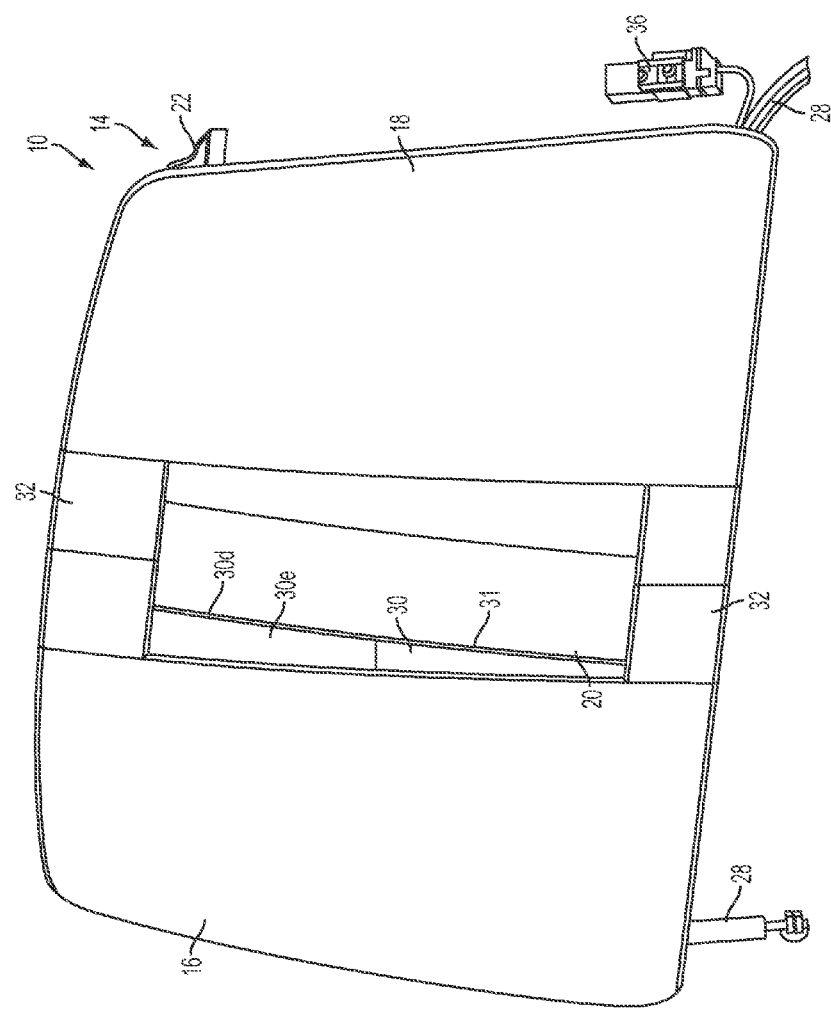
FIG. 2 is a perspective view of the rear slider window assembly of the present invention.
Figure 3:
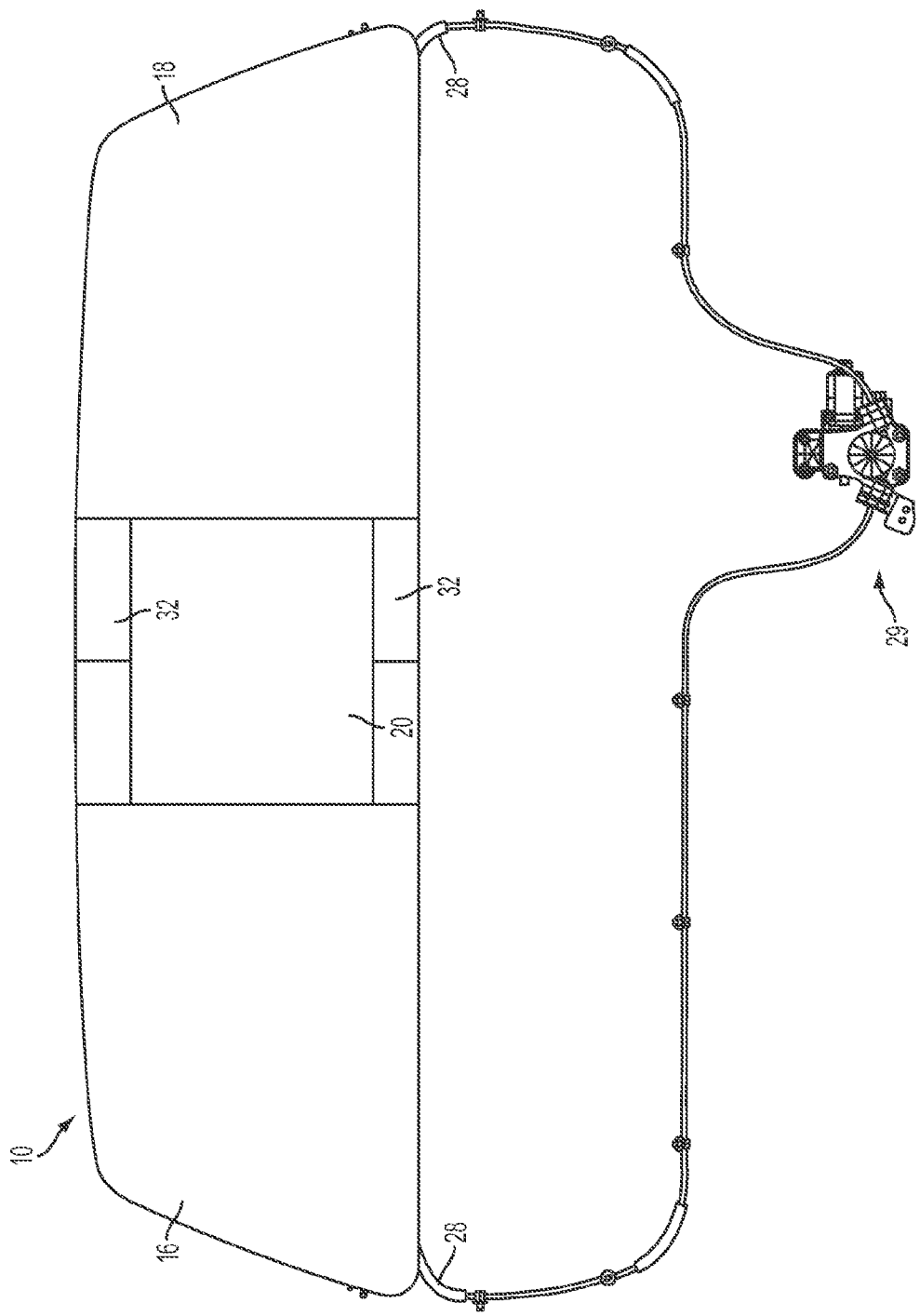
FIG. 3 is a rear elevation of the rear slider window assembly of FIG. 2.
Figure 4:
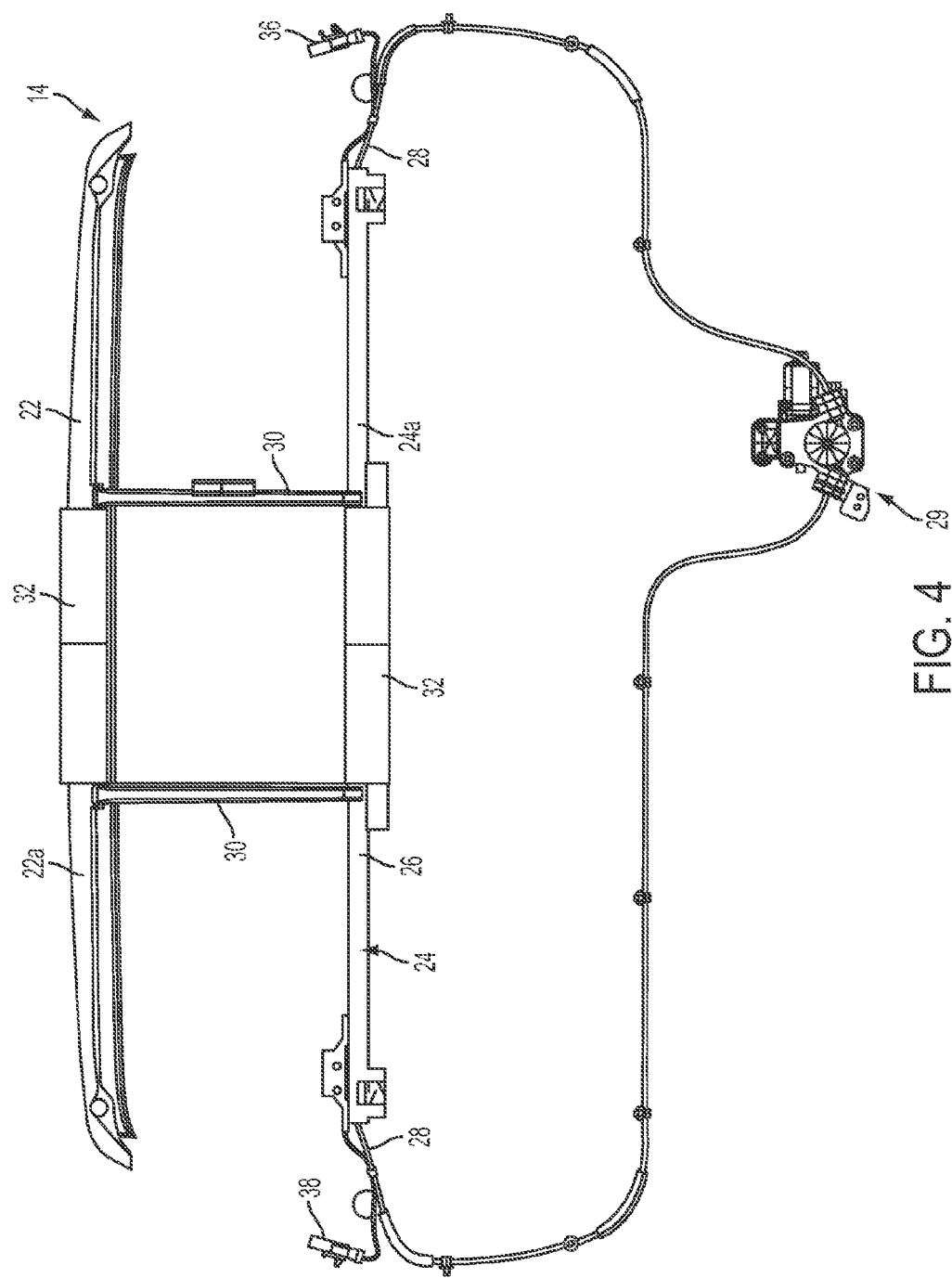
FIG. 4 is a rear elevation of the rear slider window assembly of FIG. 2, shown without the fixed window panels.

Referring now to the drawings and the illustrative embodiments depicted therein, a rear slider window assembly 10 of a vehicle 12 (such as a pickup truck or the like) includes a window frame 14, a pair of side fixed window panels 16, 18 and a movable window panel 20 that is movable relative to frame 14 and fixed window panels 16, 18 between an opened position and a closed position (FIGS. 1 and 2). Frame 14 comprises an upper rail 22 and a lower rail 24 (FIGS. 4-6), with the upper and lower edge regions of movable window panel 20 movably or slidably received in and along the respective upper and lower rails 22, 24. Lower rail 24 comprises an elongated generally U-shaped channel portion 26 disposed generally horizontally along the rear slider window and spanning at least part of each of the fixed window panels 16, 18. The lower edge region of the movable window panel 20 may be received in or attached to a carrier, which is movably received in channel portion 26 of lower rail 24, while the upper edge region of the movable window panel may be received in a channel portion 27 of upper rail 22, whereby the movable window panel is movable or slidable along channel portions 26, 27 as the movable window panel 20 is moved between its opened and closed positions, such as via manual movement of the window panel or via powered movement of cables 28 of a movable window drive system 29 that controls powered movement of the movable window panel.

The rear slider window assembly 10 is configured to be installed at a vehicle with the fixed window panels 16, 18 in a generally vertical orientation, and with the movable panel 20 angled relative to the fixed window panels to limit glare to the driver when viewing the centrally located closed movable panel through the interior rearview mirror of the vehicle, as discussed below. The frame 14 of the window assembly is formed to facilitate attachment of generally wedge-shaped vertical frame members 30 that are disposed at opposite sides of the generally centrally located opening of the fixed window panels, as also discussed below.

Figure 16:
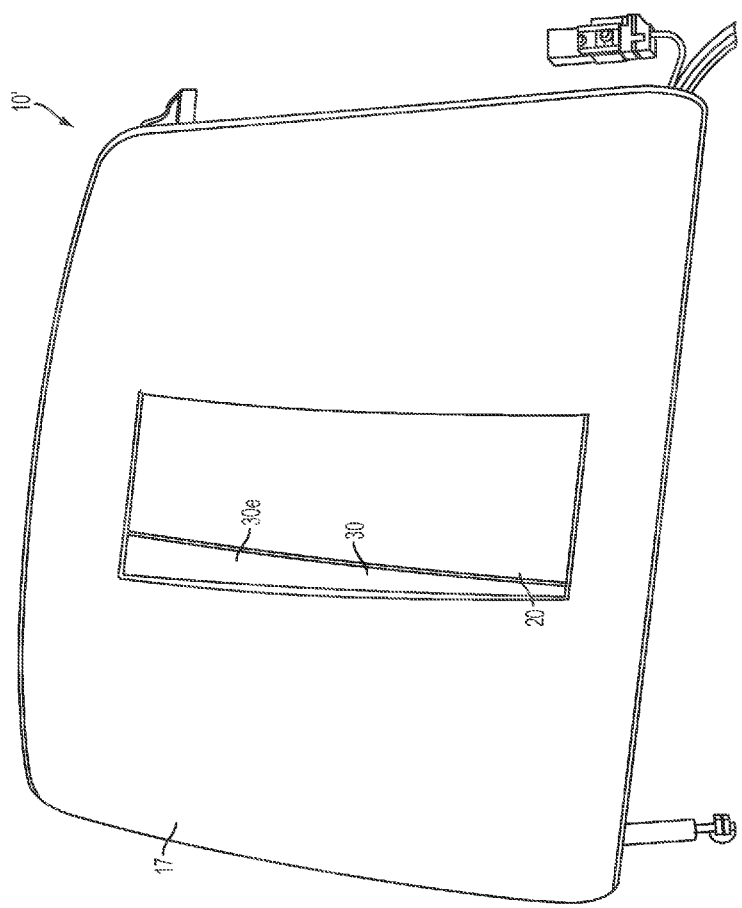
FIG. 16 is a perspective view of another rear slider window assembly of the present invention, shown with a single fixed glass panel having an opening established therethrough.

In the illustrated embodiment, window assembly 10 includes two fixed window panels or panel portions 16, 18 that are spaced apart so as to define an opening therebetween (and with upper and lower appliquées or trim or filler panels or elements 32 disposed at the upper and lower regions of the opening and between the fixed window panels). Optionally, the window assembly 10' (FIG. 16) may comprise a hole-in-glass window configuration, where a single fixed glass panel 17 has an aperture or hole or opening established therethrough to define separate spaced apart fixed window panels or panel portions, such as in a similar manner as the window assemblies described in International Publication No. WO2012/037190, which is hereby incorporated herein by reference in its entirety.

Figure 5:
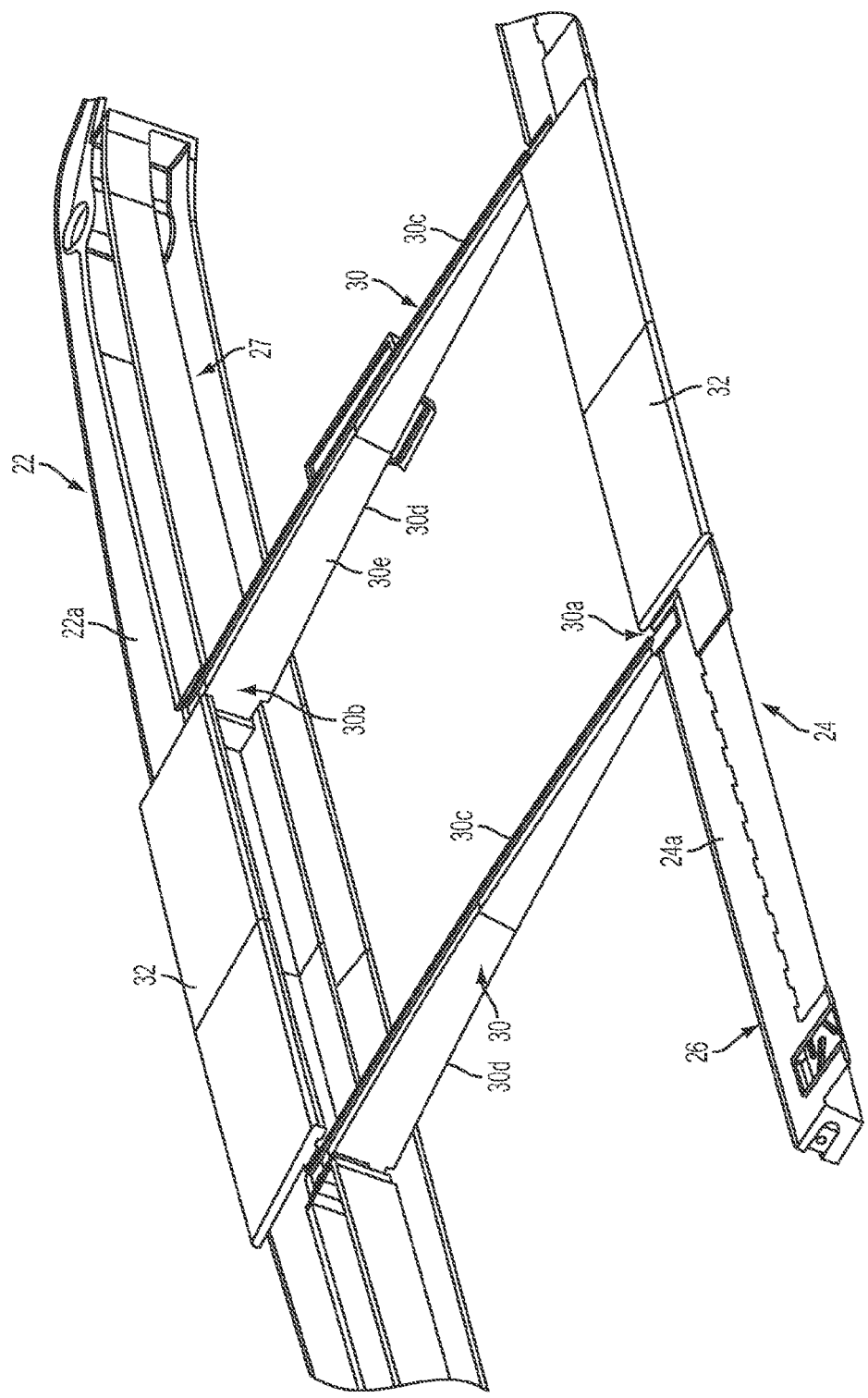
FIG. 5 is a perspective view of the frame of the rear slider window assembly of FIG. 2.
Figure 6:
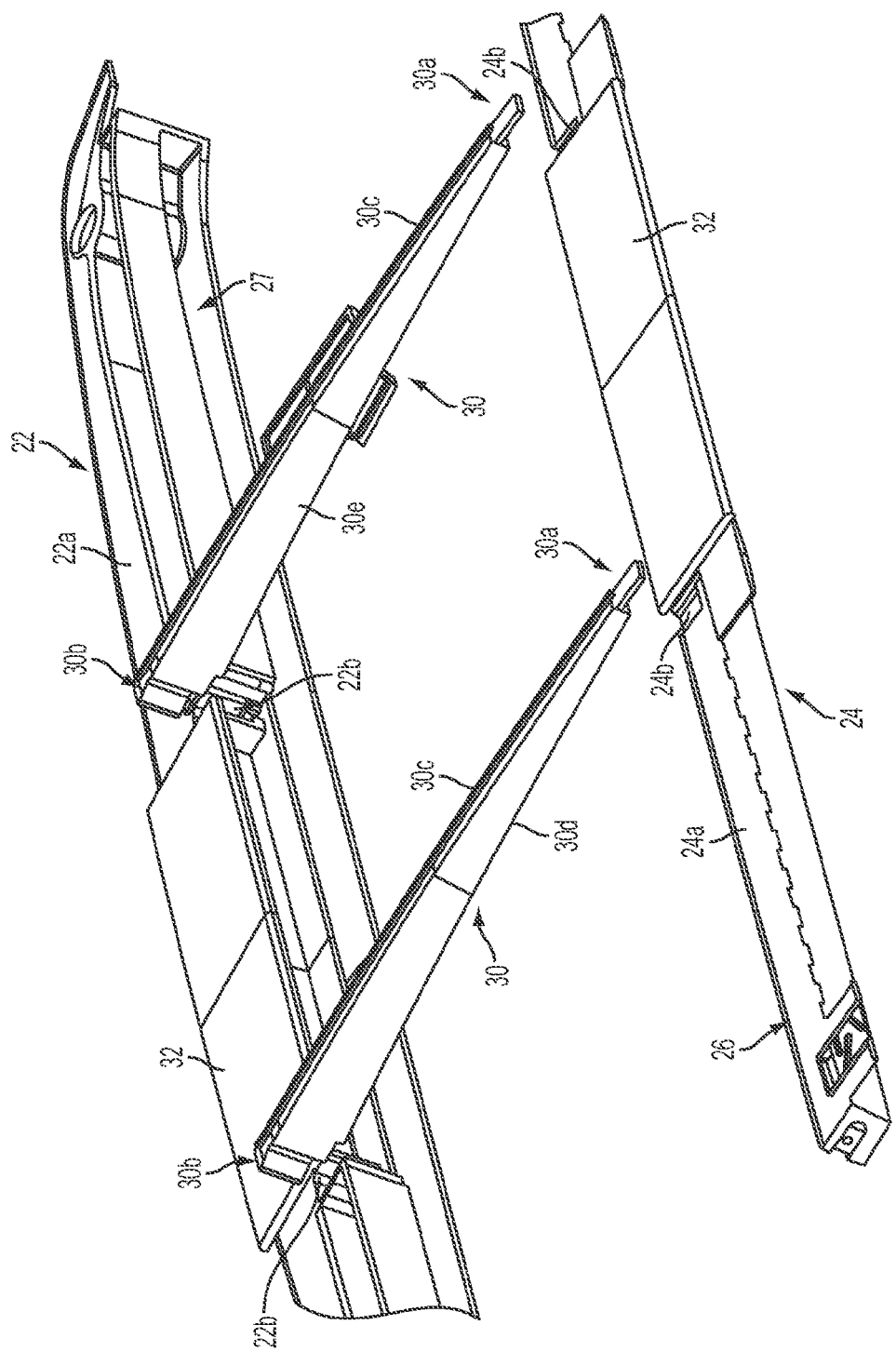
FIG. 6 is an exploded perspective view of the frame of the rear slider window assembly of FIG. 2.

As can be seen in FIGS. 5 and 6, the upper rail 22 is wider or has a depth dimension (the dimension across the upper rail from a forward portion or surface of the rail (that is forward when the window is mounted at a vehicle) to a rearward portion or surface of the upper rail) that is greater than the width or depth dimension of lower rail 24 (the dimension across the lower rail from a forward portion or surface of the rail (that is forward when the window is mounted at the vehicle) to a rearward portion or surface of the lower rail). The added or greater thickness or depth of the upper rail (relative to the lower rail) is provided rearward of the channel portion 27 of the upper rail 22, such that, when rear surfaces 22a, 24a of the upper and lower rails 22, 24 are generally aligned (such that the fixed window panels attached thereto are generally vertically oriented), the upper channel portion 27 is forward of the lower channel portion 26, such that the movable window panel 20, when movably disposed in the channel portions 26, 27 is angled or tilted relative to the fixed window panels 16, 18.

As best shown in FIGS. 5 and 6, the vertical frame members 30 of window frame 14 are wedge-shaped or tapered and are narrower at their lower ends 30a than at their upper ends 30b. Vertical frame members 30 include rear surfaces or attachment surfaces 30c that face rearward with respect to the vehicle and that are generally coplanar with the rear surfaces or attachment surfaces 22a, 24a of the upper and lower rails. Thus, the fixed window panels 16, 18 may be bonded or sealed against the rear surfaces 22a, 24a of the upper and lower rails and against the rear surfaces 30c of the vertical frame members 30 to attach the fixed window panels 16, 18 at the frame 14 (with the appliqués 32 optionally being bonded or attached at the respective upper and lower rails between the vertical frame members). The generally vertical frame members may be partially curved to correspond to a curvature of the fixed window or windows, with the rear or attachment surfaces at the upper and lower end regions of the generally vertical frame members being generally coplanar to the rear or attachment surfaces of the upper and lower rails, respectively. The vertical frame members 30 include front surfaces 30d opposite the rear surfaces 30c, with the front surfaces 30d being angled with respect to the rear surfaces 30c so that the front surfaces 30d are generally aligned at or established at or generally coplanar to the front edge or surface of the channel portions of the upper and lower rails.

Thus, when the vertical frame members 30 are attached at the lower rail 24 and at the upper rail 22, and the rear faces 30c of the vertical frame members are bonded or sealed at the fixed window panels and the front surfaces 30d provide angled spaced apart surfaces at which the angled movable window panel 20 seals against when the movable window panel is in its closed position. Optionally, the vertical frame members 30 may each be formed via a respective two shot molding process, such as a two shot injection molding process, where the plastic wedge-shaped or tapered member is formed during a first injection molding process, and the seals 31 (FIG. 2) along the front and/or rear surfaces of the frame members are formed or molded thereto via respective second injection molding processes. However, clearly, other means may be implemented to attach the seals 31 at the front and rear surfaces of the frame members, such as via adhesive attachment of extruded or otherwise formed seals or sealing elements at and along the front and rear surfaces of the vertical frame members 30, while remaining within the spirit and scope of the present invention.

Figure 7:
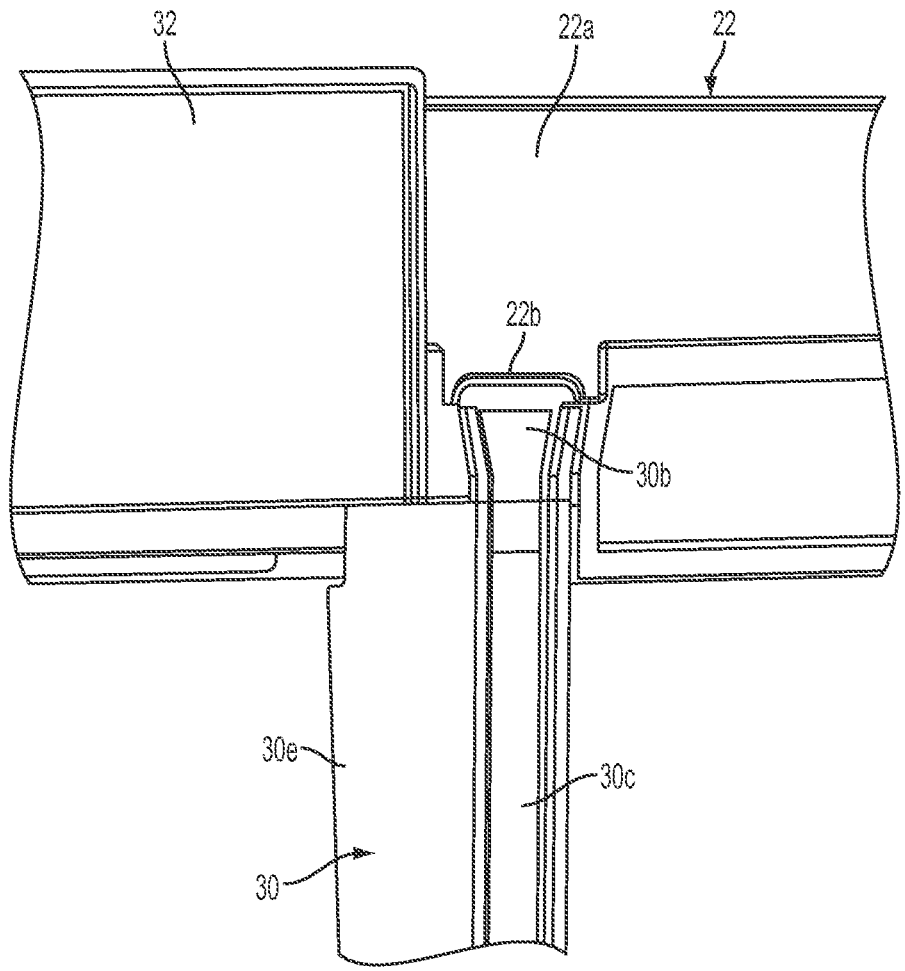
FIG. 7 is an enlarged perspective view of the connection of a vertical frame member at the upper rail of the frame of the rear slider window of the present invention.
Figure 8:
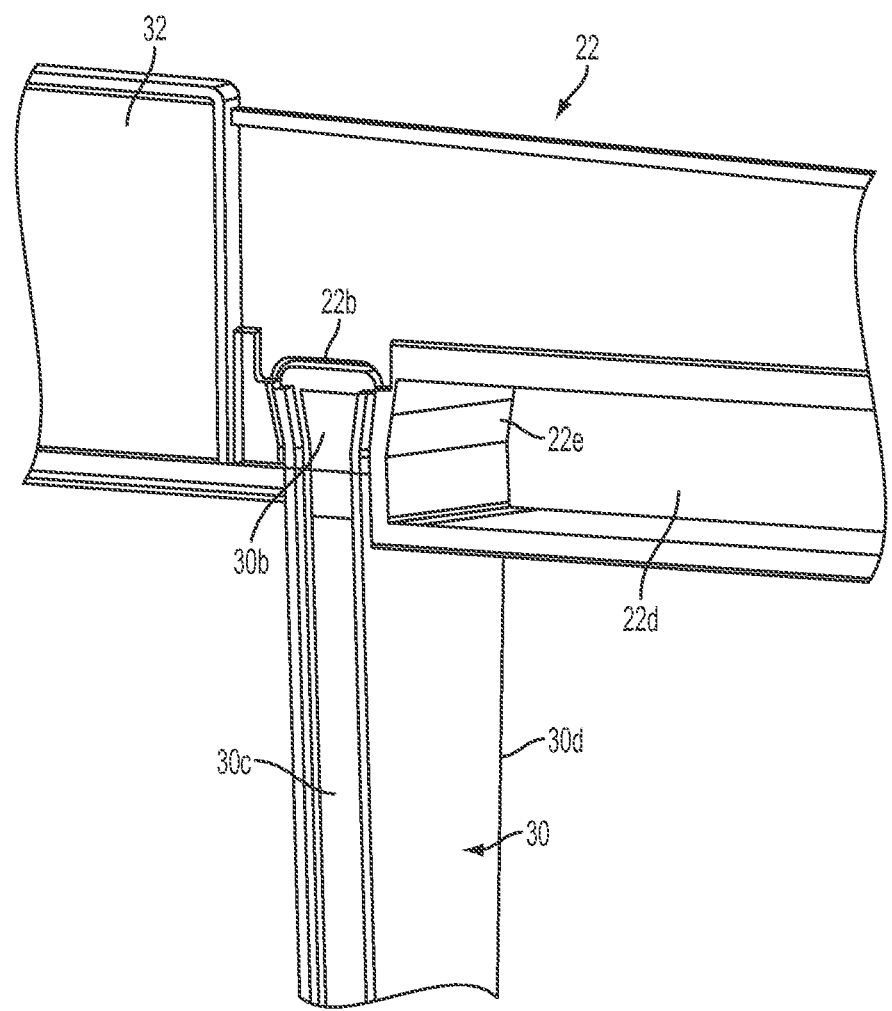
FIG. 8 is another enlarged perspective view of the connection of the vertical frame member at the upper rail of the frame of the rear slider window of the present invention.

In the illustrated embodiment, the upper end 30b of the vertical frame member 30 is a wedge shape or dovetail shape or truncated triangular shape and is configured to slide or snap into a correspondingly formed recess or passageway 22b of the upper rail, while the lower end 30a of the vertical frame member 30 includes a tab that is received in a recess 24b of the lower rail and may be adhered or otherwise attached at the lower rail 24. Thus, and as can be seen with reference to FIG. 6, the frame 14 may be assembled by arranging the upper and lower rails 22, 24 in a spaced apart manner and inserting the ends 30a, 30b of the frame members 30 into the respective recesses or passageways 24b, 22b of the rails 24, 22. Optionally, the inner end region of the recess or passageway 22b of the upper rail may include a narrowed portion 22c and the dovetail shaped upper end 30b of the frame member 30 may also include a narrowed portion to enhance the alignment and fit of the upper end 30b of frame member 30 at the upper rail 22. Optionally, and desirably, the dimensions of the recesses of the upper frame member 22 and the dovetail shape of the upper ends 30b of the vertical frame members 30 are selected so that there is a substantially tight or press fit engagement when the vertical frame members are attached at the upper frame member. As can be seen in FIGS. 6-8, the upper end 30b has a wider or flared end portion that tapers inward and downward, such that, when the upper end 30b is received in the correspondingly formed receiving portion 22b of the upper rail, the upper end of the frame member is securely retained therein and does not pivot side to side or move vertically with respect to the upper rail. Thus, the dovetail attachment of the generally vertical frame members 30 at the upper rail 22 provides enhanced attachment or assembly of the window frame, whereby the upper end 30b is tightly held via multiple walls and engaging surfaces within the upper rail to enhance the structural rigidity of the assembled frame. The secure attachment of the generally vertical frame members at the rails may thus be achieved without adhesive or fasteners such as screws or bolts or pins or the like.

Figure 9:
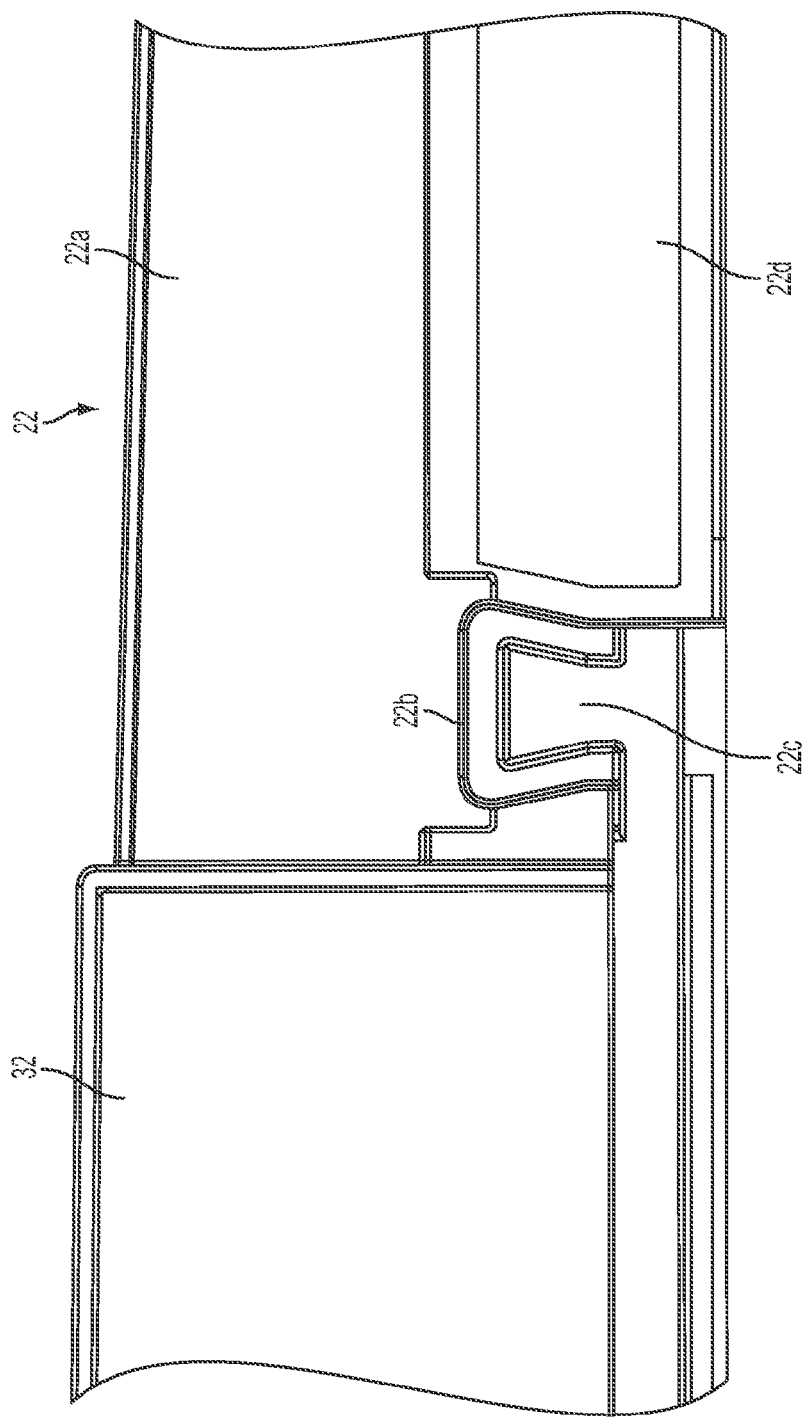
FIG. 9 is an enlarged plan view of the upper rail of the frame, shown without the vertical frame member attached thereto.
Figure 10:
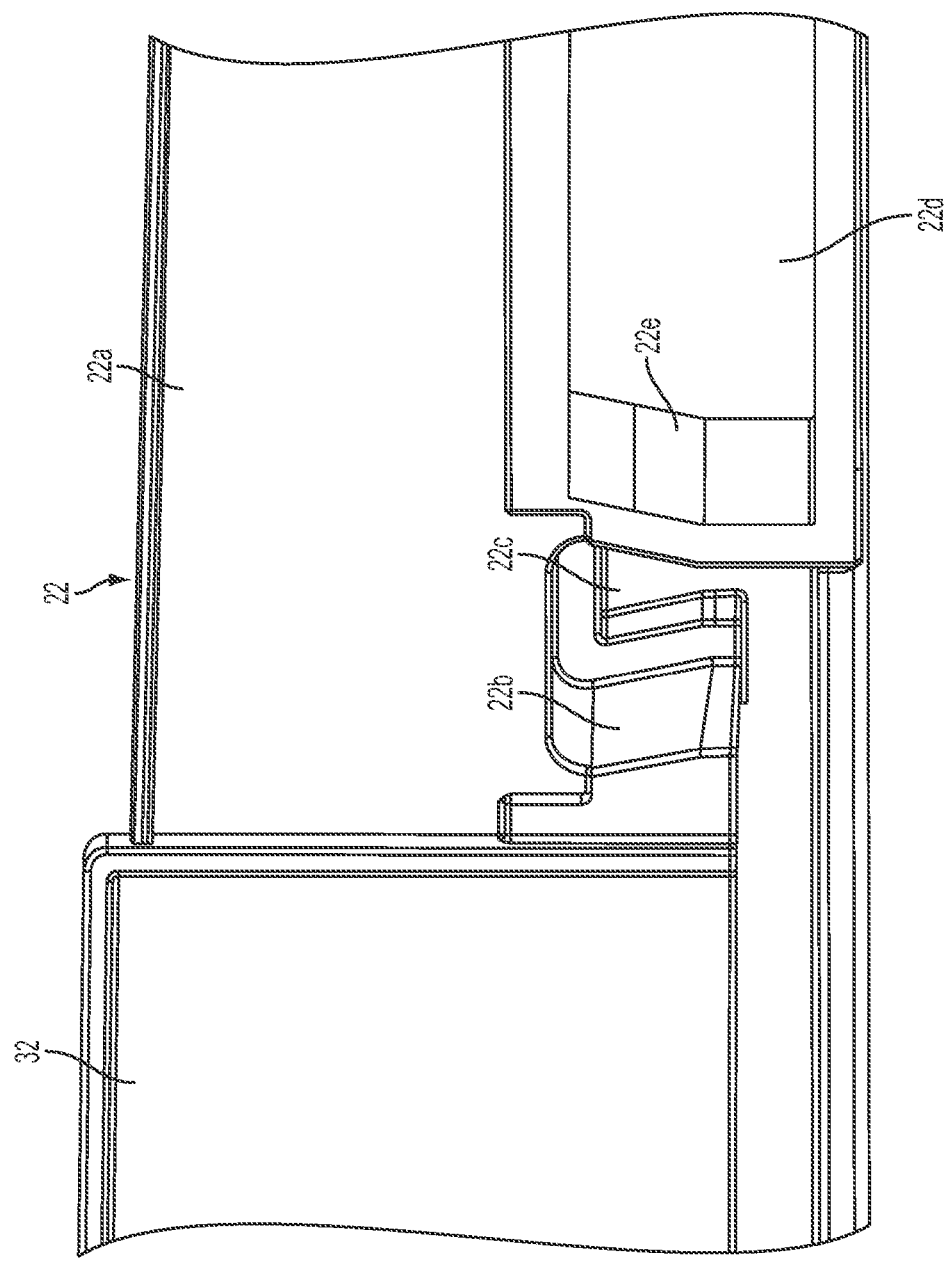
FIG. 10 is an enlarged perspective view of the upper rail of the frame of FIG. 9.
Figure 11:
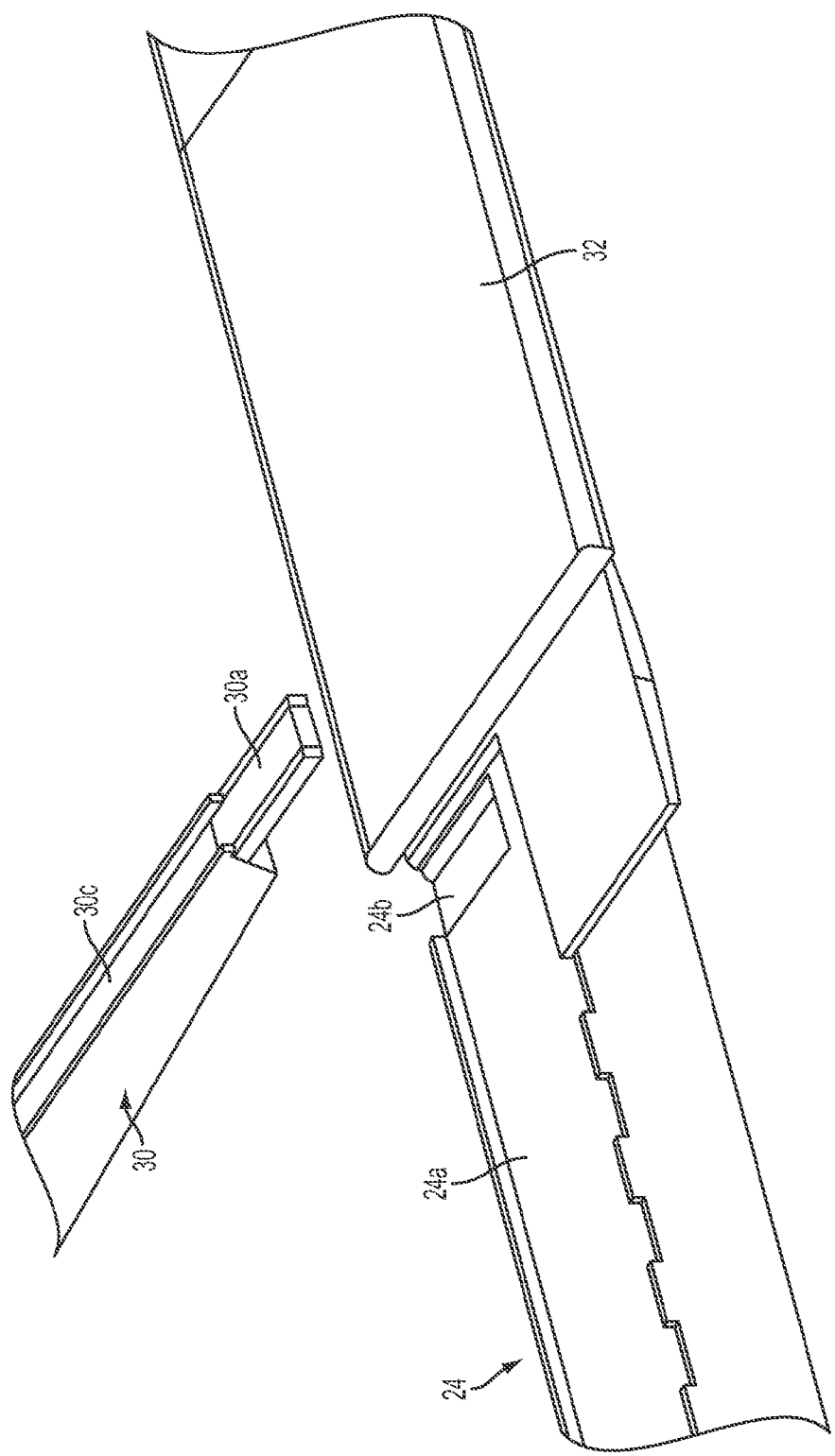
FIG. 11 is an enlarged perspective view of the connection of the vertical frame member at the lower rail of the frame of the rear slider window of the present invention.
Figure 12:
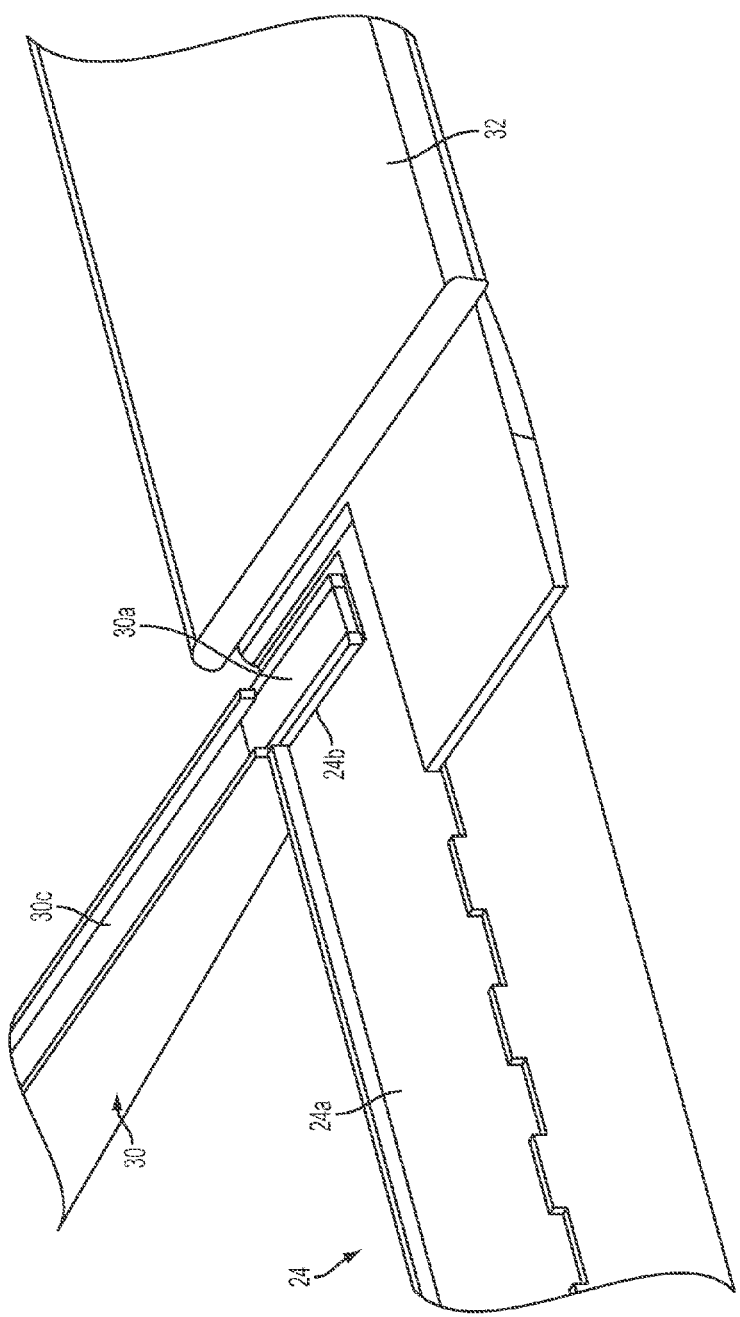
FIG. 12 is an exploded perspective view of the connection of the vertical frame member at the lower rail of the frame of FIG. 11.
Figure 13:
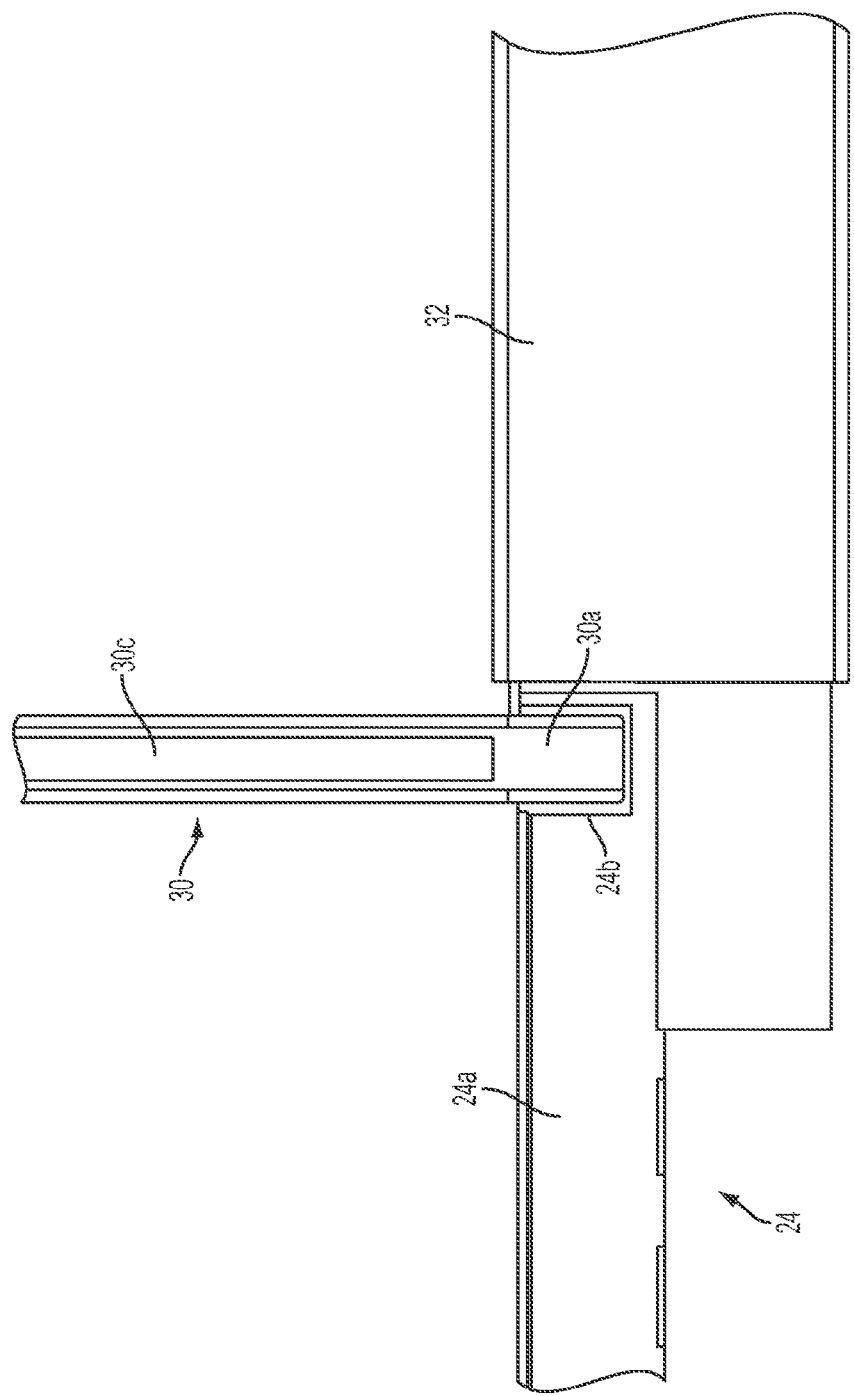
FIG. 13 is an enlarged plan view of the connection of the vertical frame member at the lower rail of the frame.

The channel portion 27 of upper rail 22 may comprise any suitable channel or rail element configured to slidably receive an upper edge portion of the movable window panel, and upper rail 22 may comprise a unitarily formed upper rail or channel. For example, the upper rail may be formed via an injection molding process, and may include recessed portions or hollowed out portions 22d (FIGS. 8-10) to reduce the weight of the upper rail, while still providing the desired or appropriate structural rigidity of the upper rail and window frame. As shown in FIGS. 8 and 10, the end wall 22e of the recessed portions 22d may form one of the walls around the recessed portions 22b, 22c for receiving the upper end 30b of the frame member 30.

As shown in FIG. 2, when the window assembly is assembled, an inboard surface 30e of the vertical frame members 30 form a visible frame portion that frames the side regions of the window opening. The dovetail attachment/construction of the frame members also limits water intrusion at the upper ends of the vertical frame members and, optionally, additional sealing material may be disposed at or around the attachment locations to further enhance the sealing and limiting of water intrusion at the attachment locations of the vertical frame members and the upper/lower frame members.

Thus, the present invention provides a multi-piece frame construction that allows for snap together or press fit attachment of the vertical frame members to the upper and/or lower frame members. The separate or individual frame members may be formed to the desired shape and configuration via any suitable forming or molding process, such as via individual or separate injection molding processes. When assembled, the rear surfaces of the upper and lower rails and of the generally vertical frame members are generally coplanar and generally vertically oriented (when the window assembly is normally mounted at a vehicle), while the front surfaces of the upper and lower rails and of the generally vertical frame members are generally coplanar but angled relative to the generally vertical plane of the rear surfaces. Thus, when the movable window panel is mounted at the rails at the desired angle, the movable window panel seals against and along the vertical rail members when in its closed position. The present invention facilitates substantial angling of the front surfaces and of the movable window panel via the separately formed or molded frame members and the snap or press fit attachment of the members.

Optionally, the drive motor assembly may utilize aspects of the drive assemblies of the types described in U.S. Pat. Nos. 4,920,698; 4,995,195; 5,146,712; 5,531,046; 5,572,376; 6,955,009 and/or 7,073,293, and/or U.S. Publication Nos. 2004-0020131 and/or 2008-0127563, which are all hereby incorporated herein by reference in their entireties.

In the illustrated embodiment, upper rail 22 and lower rail 24 comprise unitarily formed (such as via respective molding or injection molding processes or the like) rails having a generally U-shaped channel portion 27, 26 that is arranged generally horizontally across the rear slider window assembly. The rails may be formed via any suitable forming means and may comprise any suitable material or materials. For example, the rails may comprise a rigid or substantially rigid molded polymeric channel (such as a polyvinylchloride material or PC—ABS or the like), and preferably a rigid polymeric material or engineered plastic material.

The benefits of embodiments of the present invention may also be realized in sliding window constructions where an aperture is created in a fixed window panel and where a movable window panel can be made to open or close the aperture. Slider windows of this type are disclosed such as in U.S. Publication No. 2003-0213179, and/or such as in RE41502, and/or such as in International Publication Nos. WO2012/037190 and/or WO 2012/088287, which are hereby incorporated herein by reference in their entireties. The benefits of embodiments of the present invention may also be realized in vehicular movable window assemblies other than a rear slider window assembly for a pickup truck or the like, such as (for example) a slider window assembly suitable for use as a movable side window for a vehicle such as a van or a bus.

Although shown and described as a horizontally movable center window that moves relative to a pair of opposite side windows (such as for applications at the rear of a cab of a pickup truck or the like), it is envisioned that the present invention is applicable to other types of movable window assemblies, such as horizontally movable window panels that move relative to a single fixed window panel and/or frames (such as for a rear or side opening of a vehicle or the like), and/or such as vertically movable window panels that move relative to one or more fixed panels and/or frames (such as for a rear or side opening of a vehicle or the like), while remaining within the spirit and scope of the present invention.

Optionally, the fixed window panels and movable window panel of the window assembly may include one or more electrically conductive elements, such as heater grids or the like, which may be powered utilizing aspects of the window assemblies described in U.S. Pat. No. 8,402,695, and/or International Publication No. WO2012/037190, which are hereby incorporated herein by reference in their entireties. The window assembly may include a heater grid on each of the fixed window panels and on the movable window panel, with a heating system that provides power to the heater grid on the movable window panel irrespective of the position of the movable window panel relative to the fixed window panel and throughout the range of movement of the movable window panel between its opened and closed positions, such as via a flexible wire that connects between the heater grid of a fixed window panel and the heater grid of the movable window panel, such as by utilizing aspects of the window assemblies described in U.S. Pat. No. 8,402,695 and/or International Publication No. WO2012/037190, incorporated above.

Figure 14:
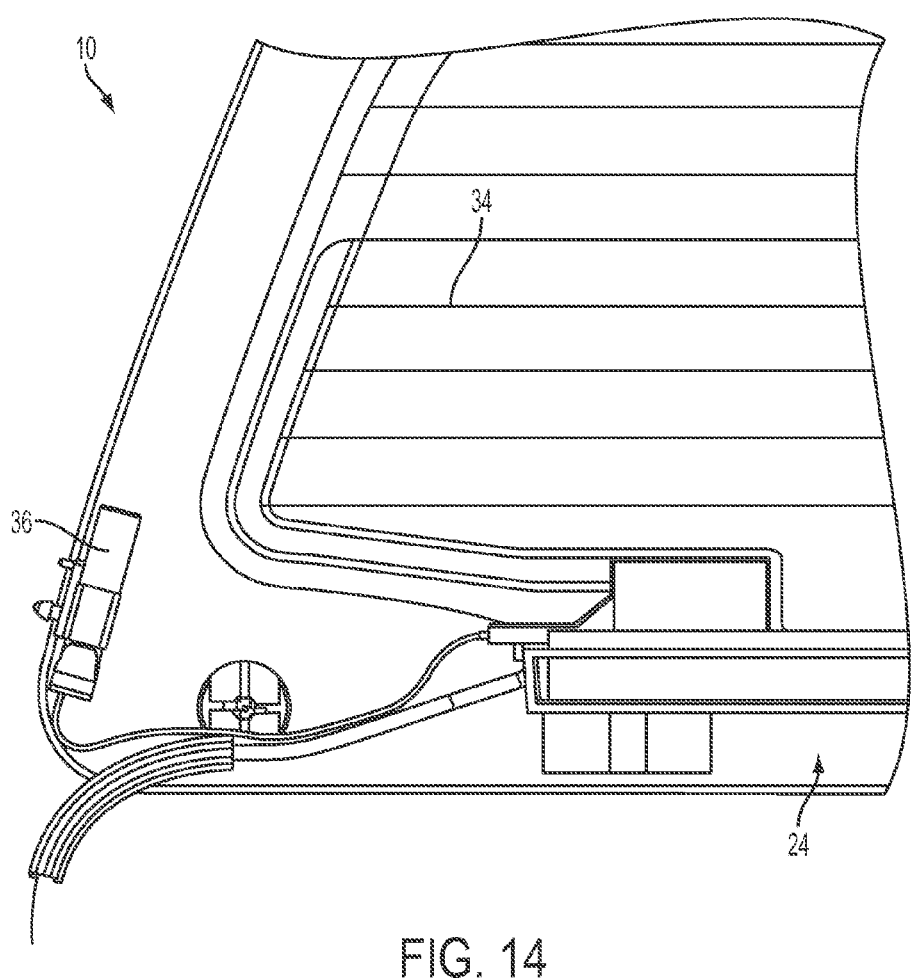
FIGS. 14 and 15 are rear elevations of the rear slider window of the present invention, showing the electrical connection to the heater grid.
Figure 15:
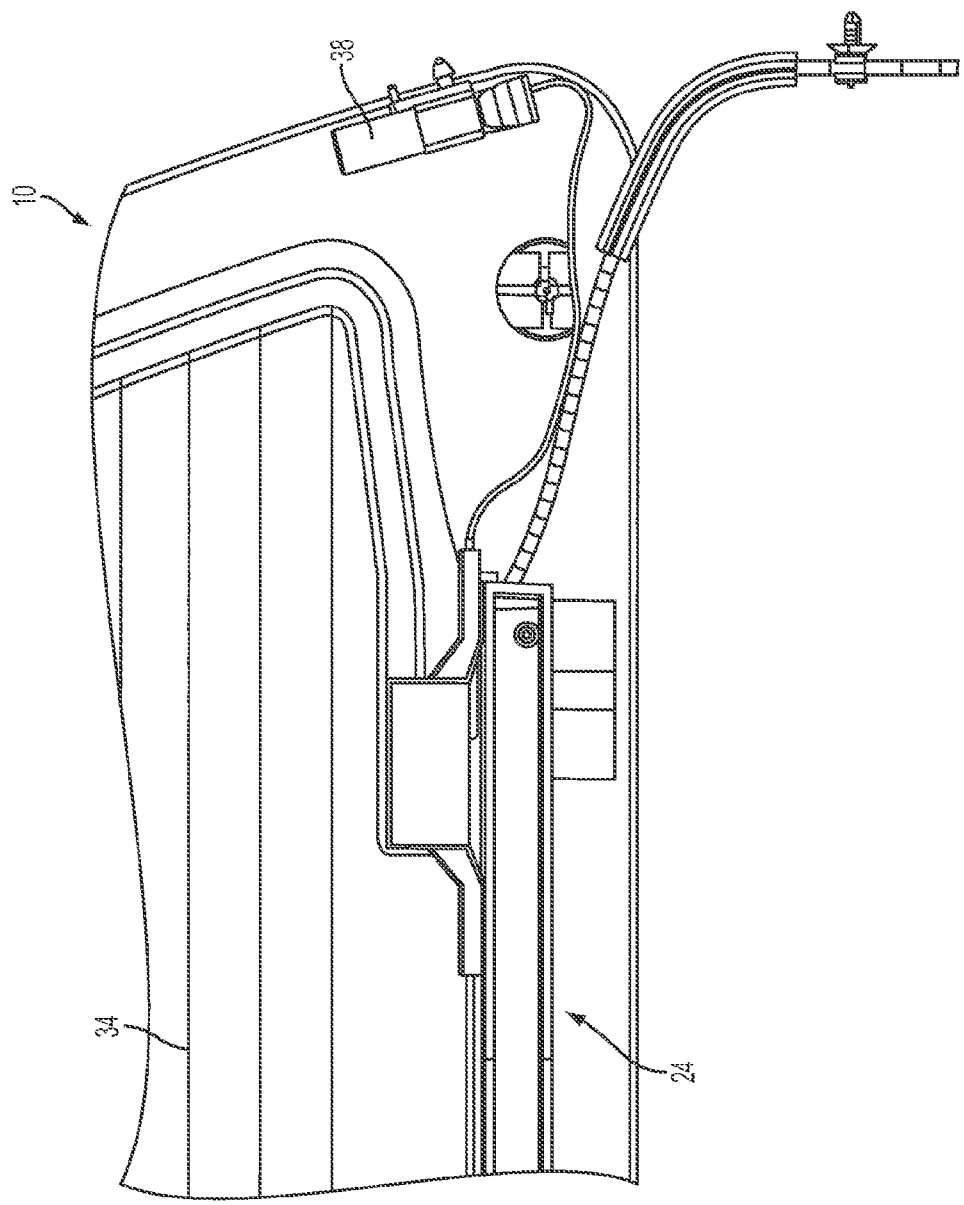

Optionally, and as shown in FIGS. 14 and 15, the window assembly 10 includes a heater grid 34 on each of the fixed window panels and on the movable window panels, with a heating system that provides power to the heater grid on the movable window panel irrespective of the position of the movable window panel relative to the fixed window panel and throughout the range of movement of the movable window panel between its opened and closed positions. The heater grids are powered via electrical connection to a vehicle wiring harness via electrical connectors 36, 38. In the illustrated embodiment, the electrical connection is made to power the window heater grids at only two points, such as via a single positive connection 36 at one side of the window assembly and a single negative connection 38 at the other side of the window assembly. Such an electrical connection system reduces the electrical connectors at the fixed glass window panel or panels so that only two connection points are used.

Optionally, and desirably, the fixed window panel or panels may include an opaque coating or layer or frit layer or the like disposed about its perimeter and around the edges that bound the window opening, in order to conceal or hide or render covert the rails and sealing elements disposed at the fixed panel. Likewise, the movable window panel may include an opaque coating or layer or frit layer or the like disposed about its perimeter regions, in order to conceal or hide or render covert the sealing elements disposed at the fixed panel, such as when the movable window panel is in its closed position.

Optionally, the window assembly or assemblies of the present invention may utilize aspects of the window assemblies described in U.S. Pat. Nos. 8,402,695; 7,073,293; 7,003, 916; 6,119,401; 6,026,611; 5,996,284; 5,799,444 and/or 6,691,464, and/or U.S. Publication Nos. 2006-0107600; 2008-0127563; 2004-0020131 and/or 2003-0213179, and/or International Publication No. WO2012/037190; WO 2012/088287 and/or WO 2012/148968, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A slider window assembly for a vehicle, said slider window assembly comprising:

a frame portion having an upper rail and a lower rail and a pair of spaced apart generally vertical frame members, said upper rail, said lower rail and said generally vertical frame members defining a generally central opening;
at least one fixed window panel that is fixed relative to said frame portion;
a movable window panel that is movable along said upper rail and said lower rail, wherein said movable window panel is movable between a closed position, where said movable window panel is disposed at said opening and engages said generally vertical frame members, and an opened position, where said movable window panel is disposed at least partially away from the opening;
wherein said upper rail includes an upper channel for movably receiving an upper region of said movable window therein;
wherein said lower rail includes a lower channel for movably receiving a lower region of said movable window therein;
wherein said upper rail has a depth dimension that is greater than a depth dimension of said lower rail;
wherein each of said generally vertical frame members is tapered so that an upper end region of said generally vertical frame member has a depth dimension that is substantially similar to the depth dimension of said upper rail and a lower end region of said generally vertical frame member has a depth dimension that is substantially similar to the depth dimension of said lower rail; and
wherein said generally vertical frame members have upper attachment portions that are generally wedge-shaped and are configured for press fit attachment at correspondingly formed recesses established at said upper rail.

2. The slider window assembly of claim 1, wherein said upper rail and said upper channel are unitarily formed via a common molding process.

3. The slider window assembly of claim 1, wherein said lower rail and said lower channel are unitarily formed via a common molding process.

4. The slider window assembly of claim 1, wherein each of said generally vertical frame members is unitarily formed via a respective molding process.

5. The slider window assembly of claim 1, wherein each of said generally vertical frame members has a rear surface that is generally coplanar with rear surfaces of said upper rail and said lower rail, and wherein said at least one fixed window panel is bonded at said rear surfaces of said generally vertical frame members, said upper rail and said lower rail.

6. The slider window assembly of claim 5, wherein each of said generally vertical frame members has a front surface and wherein said movable window panel seals against said front surfaces of said generally vertical frame members when in its closed position.

7. The slider window assembly of claim 6, wherein a sealing element is established along said front surfaces of said generally vertical frame members.

8. The slider window assembly of claim 7, wherein each of said generally vertical frame members is formed via a respective first molding process and said sealing element is established along said front surface of said generally vertical frame member via a respective second molding process.

9. The slider window assembly of claim 1, wherein said at least one fixed window panel comprises first and second fixed window panels defining an opening therebetween.

10. The slider window assembly of claim 1, wherein said at least one fixed window panel comprises a single fixed window panel having an opening therethrough.

11. The slider window assembly of claim 1, wherein said at least one fixed window panel has at least one heater grid established thereat and wherein said movable window panel has a heater grid established thereat, and wherein power to said heater grids of said at least one fixed window panel and said movable window panel is provided via two electrical wires and connections that electrically connect the wires to a positive electrical wire of a vehicle wiring harness and a negative electrical wire of a vehicle wiring harness.

12. A slider window assembly for a vehicle, said slider window assembly comprising:
a frame portion having an upper rail and a lower rail and a pair of spaced apart generally vertical frame members, said upper rail, said lower rail and said generally vertical frame members defining a generally central opening;
at least one fixed window panel that is fixed relative to said frame portion;
a movable window panel that is movable along said upper rail and said lower rail, wherein said movable window panel is movable between a closed position, where said movable window panel is disposed at said opening and engages said generally vertical frame members, and an opened position, where said movable window panel is disposed at least partially away from the opening;
wherein said upper rail includes an upper channel for movably receiving an upper region of said movable window therein;
wherein said lower rail includes a lower channel for movably receiving a lower region of said movable window therein;
wherein said upper rail has a depth dimension that is greater than a depth dimension of said lower rail, said depth dimension of said upper rail spanning between a front surface and a rear surface of said upper rail and said depth dimension of said lower rail spanning between a front surface and a rear surface of said lower rail;
wherein each of said generally vertical frame members is tapered so that an upper end region of said generally vertical frame member has a depth dimension that is substantially similar to the depth dimension of said upper rail and a lower end region of said generally vertical frame member has a depth dimension that is substantially similar to the depth dimension of said lower rail;
wherein said generally vertical frame members have upper attachment portions that are configured for press fit attachment at correspondingly formed upper recesses established at said upper rail, and wherein each of said upper attachment portions has a wider upper end and a narrowed portion, such that when said upper attachment portions are attached at the correspondingly formed upper recesses, said wider upper ends of said upper attachment portions limit vertical movement of said generally vertical frame members relative to said upper rail;
wherein said generally vertical frame members have lower attachment portions that are configured to be received at correspondingly formed lower recesses established at said lower rail; and
wherein, with said upper attachment portions attached at said upper recesses, an attachment surface of each of said generally vertical frame members is generally coplanar with said front surface of said upper rail, and wherein, with said lower attachment portions received at said lower recesses, said attachment surface of each of said generally vertical frame members is generally coplanar with said front surface of said lower rail.

13. The slider window assembly of claim 12, wherein said upper rail and said upper channel are unitarily formed via a common molding process.

14. The slider window assembly of claim 12, wherein said lower rail and said lower channel are unitarily formed via a common molding process.

15. The slider window assembly of claim 12, wherein each of said generally vertical frame members is unitarily formed via a respective molding process.

16. The slider window assembly of claim 12, wherein said at least one fixed window panel is bonded at said attachment surfaces of said generally vertical frame members and attachment surfaces of said upper rail and said lower rail.

17. The slider window assembly of claim 16, wherein each of said generally vertical frame members has a front surface opposite said attachment surface and wherein said movable window panel seals against said front surfaces of said generally vertical frame members when in its closed position.

18. The slider window assembly of claim 17, wherein a sealing element is established along said front surfaces of said generally vertical frame members.

19. The slider window assembly of claim 18, wherein each of said generally vertical frame members is formed via a respective first molding process and said sealing element is established along said front surface of said generally vertical frame member via a respective second molding process.

20. The slider window assembly of claim 12, wherein one of (i) said at least one fixed window panel comprises first and second fixed window panels defining an opening therebetween and (ii) said at least one fixed window panel comprises a single fixed window panel having an opening therethrough.

* * * * *